United States Patent Office 3,226,845
Patented Jan. 4, 1966

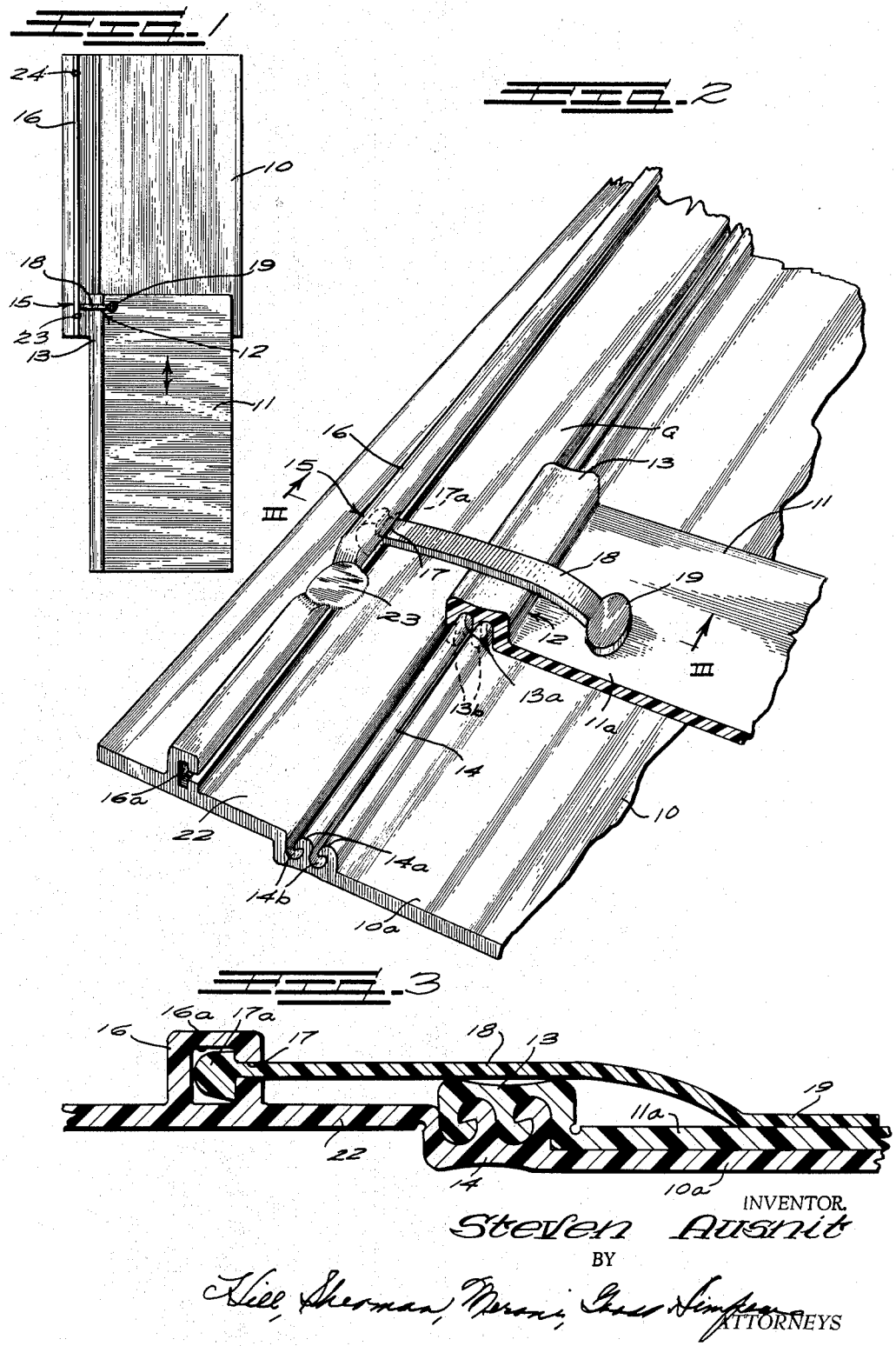

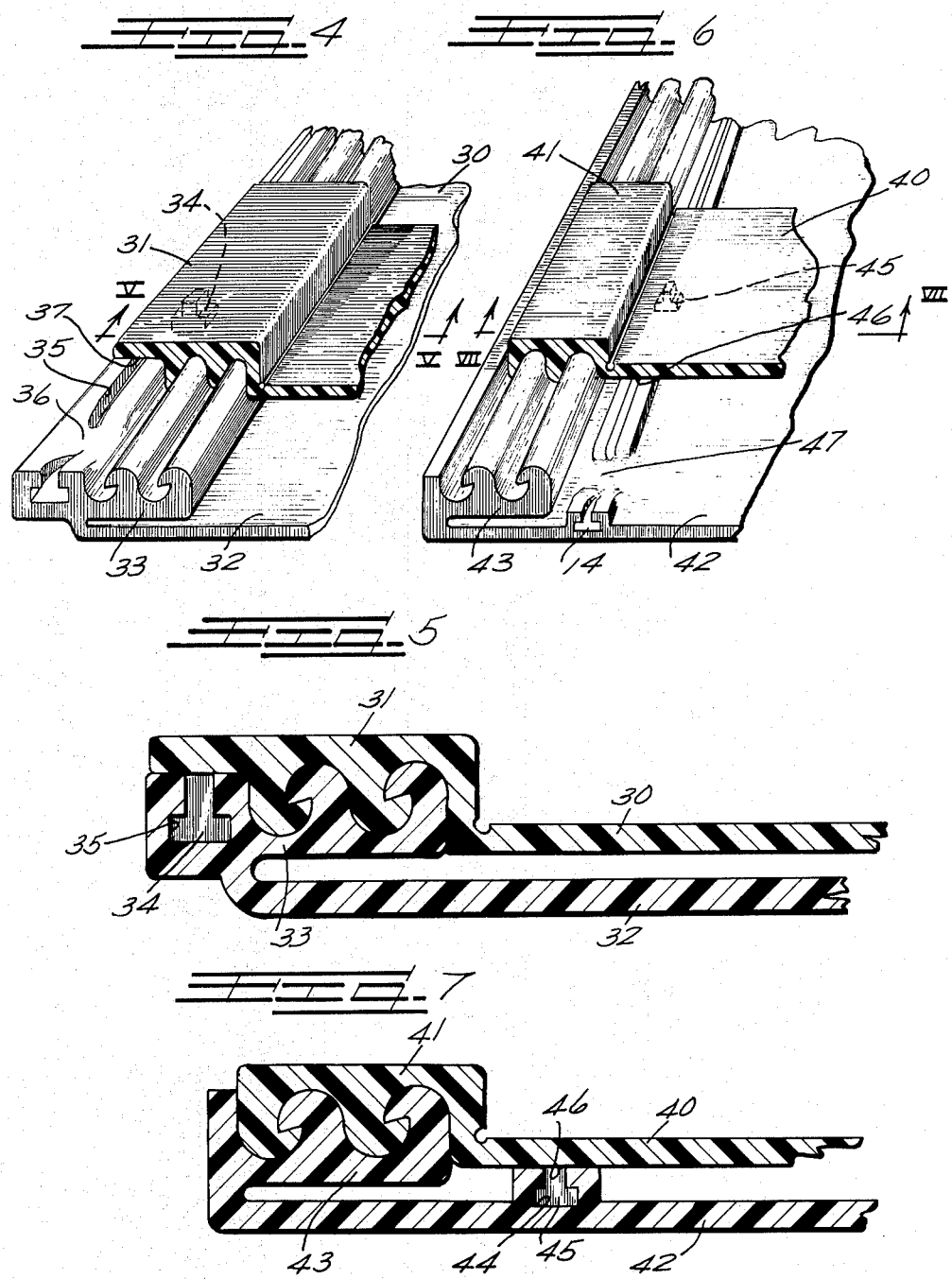

3,226,845
SLIDING FASTENER STRIPS
Steven Ausnit, 124 E. 61st St., New York, N.Y.
Filed Feb. 20, 1964, Ser. No. 346,236
3 Claims. (Cl. 35—9)

The present invention relates to improvements in fastener elements for fastening two members together wherein the fastener elements afford relative linear sliding movement between the members which is stopped at a limit of sliding movement.

More particularly the invention relates to a structure embodying fastener members such as the extruded plastic interlocking type which have relative interlocking rib and groove elements thereon which are interengaged by a force or a pressure normal to the surface thereof to push the rib elements into interlocked inserted retained relationship with the groove elements. In the present arrangement the fastener strips provide tracks which are linearly slidable so as to fasten members together which must have relative sliding movement. For example the fastener strips may attach an upper sheet to a lower sheet wherein the upper sheet is slid linearly onto and off of the lower sheet to cover or uncover information on the lower sheet. By way of an example for such a use, the upper sheet may have questions contained thereon with answers provided on the lower sheet wherein repeated sliding movement between the upper and lower sheet is required.

In an embodiment of the invention the sheets would be attached by two parallel fastener tracks which can slide back and forth on each other, wherein the second set of tracks prevents disengagement of the first set of tracks, and wherein a track element of the second set of tracks is relatively short and engages a stop at the ends of its travel to prevent the first tracks from sliding completely apart and becoming disengaged.

An object of the present invention is to provide an improved arrangement wherein the elements of slidable fastener tracks are prevented from becoming disengaged by a unique structure.

A further object of the invention is to provide improved relatively linearly slidable fastener means wherein disengagement of the fastener means at the end of the relative sliding movement is prevented.

A still further object of the invention is to provide a structural relationship embodying relatively inexpensively manufactured extruded plastic fastener strips used for attaching two sheets or similar members and permitting relative sliding movement therebetween.

A still further object of the invention is to provide an improved structural relationship between interlocking rib and groove type fastener elements which may be slidably related to each other.

Other objects, advantages and features will become more apparent with the teaching of the principles of the present invention in connection with the disclosure of the preferred embodiments thereof in the specification, claims and drawings, in which:

FIGURE 1 is a top plan view of fastener tracks attaching sheets to each other in accordance with the principles of the invention;

FIGURE 2 is an enlarged fragmentary view of the fastener tracks shown in perspective;

FIGURE 3 is an enlarged fragmentary sectional view taken substantially along a line III—III of FIGURE 2;

FIGURES 4 and 5 illustrate another form of slide arrangement with FIGURE 4 being a fragmentary perspective view and FIGURE 5 a sectional view taken substantially along line V—V of FIGURE 4; and FIGURES 6 and 7 are illustrations of another form of slider with FIGURE 6 being a fragmentary perspective view and FIGURE 7 being an enlarged sectional view taken substantially along line VII—VII of FIGURE 6, As shown on the drawings:

FIGURE 1 illustrates a lower sheet 10 with an upper sheet 11 fastened thereto and relatively slidable up and down in a linear direction as indicated by the arrowed line on the sheet 11. These sheets are shown by way of example as members which may be attached to each other and it will of course be understood that the fastening arrangement to be described may be used with other members which require attachment and relative linear movement.

At the edge of the sheets 10 and 11 is a first set of fastener tracks 12 and a second set of fastener tracks 15. The first and second sets extend parallel to each other. The first set of tracks 12 principally fastens the sheets to each other and permits relative linear sliding movement guiding the sheets to maintain them in their parallel linear relationship, and the second set of tracks 15 prevents the first set of tracks from being disengaged from each other at the end limits of the relative sliding movement of the elements of the first track 12. The second set of tracks also adds to the strength of the fastening attachment between the sheets.

The first set of tracks or fastening strips 12 includes an upper element 13 and a lower element 14. These elements have interlocking ribs and grooves thereon and are shaped to coact so that they are normally interlocked. They may be formed by being of plastic and extruded through a die head in the exact shape desired, and interlocked by applying a force or pressure in a lateral direction normal to the upper and lower surfaces of the strip or track 12 which pushes the resilient ribs into the resilient grooves and permits them to interlock. The upper track element 13 is shown with grooves 13a and ribs 13b. The lower track element 14 has ribs 14a and grooves 14b. The ribs 14a are hook-shaped to be received by the complementary grooves 13a, and the ribs 13b are hook-shaped to be received by the complementary grooves 14b. While other shapes of interlocking rib and groove elements may be employed the preferred hook-shaped arrangement is illustrated for providing a relatively strong fastening function to maintain the sheets together, and permit relative axial sliding. The strips may be extruded of polyethylene or vinyl or similar suitable plastic material which is relatively slippery to permit linear sliding movement. The upper element 13 and lower element 14 are relatively long and are substantially the length of the sheets 10 and 11 to be attached, and will be coextensive when the sheets are on top of one another, and will be drawn apart when the upper sheet is pulled down to uncover the lower sheet in the position shown in FIGURE 1.

The second set of tracks or strips 15 includes a first element 16 and a second element 17. The element 16 has a grove 16a and the element 17 has a rib or a head element 17a with the head and groove being coactingly shaped so as to remain interlocked and permit relative linear sliding. Other forms of head or rib and groove shapes may be employed in the second strip 16, but the form shown, wherein the head and groove may be generally described as arrowhead shaped, is preferred.

The sets of tracks 12 and 15 extend parallel to each other, and the elements 14 and 16 of the two tracks are attached to each other by a joining web portion 22. The web portion 22 and the elements 14 and 16 may be manufactured at the same time and be integral by being extruded through the same extruding head.

The upper track element 13 may have an attaching flange 11a for attaching it to the sheet 11, and the lower track element 14 may have an attaching flange 10a for attachment to the sheet. Attachment may be accomplished by cement, heat sealing or other suitable means. Also it is contemplated that the sheets 10 and 11 may be extruded simultaneously with the elements of the tracks so as to be unitary and of one piece, and this is the arrangement shown with the flanges 10a and 11a integral with the sheets 10 and 11.

For attaching the upper track element 17 of the second track to the upper element 13 of the first track, a relatively narrow strip 18 is employed. The strip 18 is attached such as by heat sealing at 19 at its base to the flange 11a. The strip 18 could also be attached directly to the top of the track element 13, but for a seat seal attachment the flange 11a provides a convenient location for attachment since heat can be applied directly.

The head 17a is shown as made integral with the strip 18. The strip 18 has a width (linear length) which is short relative to the linear length of the track elements 13, 14 and 15. With this construction the track elements can slide relatively linearly, and the track element 17 will engage stops 23 and 24, FIGURES 1 and 2, at the limits of relative linear travel. This stops relative linear sliding movement of the upper and lower track elements 13 and 14 and prevents their becoming disengaged. The head 17a will slide smoothly along within its groove 16a, and the head will have sufficient length, and the strip 18 will have sufficient width so that the head will not wedge or turn sideways within its groove 16a. The stops 23 and 24 can be of vairous constructions and are simply made by applying heat to the track element 15 at the location desired collapsing the material around the groove 16a and providing a stop.

In summary the first set of tracks 12, and a second set of tracks 15 are provided each extending parallel and each having upper and lower elements respectively attached to relatively linearly slidable sheets 10 and 11. The upper track element 17 of the second set of tracks is made relatively short so as to engage stops at the ends of the linear travel and prevent disengagement of the elements of the other set of tracks.

In FIGURES 4 and 5, an upper sheet 30 is positioned over a lower sheet 32 in much the same relationship as shown between the sheets 11 and 10 respectively of FIGURE 1. The sheets have integral fastener strips or tracks at their side edges with the sheet 30 having a track 31 and the sheet 32 having a track 33. The tracks have interlocking rib and groove elements to hold the sheets together, and to restrain their relative movement to a linear movement only. The sheets 30 and 32 may extend laterally to provide a full sheet, or may be short side portions which are attachable to sheets. The sheets and the tracks are integral and of one piece and may be simultaneously extruded. For example, the sheets and their tracks may be formed of a thermoplastic with the sheet 30 and its track 31 being simultaneously extruded through an opening in a die shaped to form the sheet and track.

The tracks are provided with means for limiting the relative sliding movement, and for this purpose the upper track 31 has a T-shaped protuberance 34 which slides in a T-shaped slot 35 in the lower track 33. The slot or groove 35, of course, extends linearly for the full length of the track 33 and will be extruded at the same time as the track through a die head which is shaped to provide the groove 35.

The protuberance or head 34 can be secured to the track, but preferably is initially formed as an elongated ridge extending for the full length of the track with the ridge subsequently being cut away for most of its length to leave only the short portion of the ridge which provides the head as shown at 34. In other words, the track 31 will be extruded with the ridge projecting from its lower surface at 37, and the ridge will later be cut from the surface 37 to leave a flat surface but the protuberance 34 will remain.

At the end of the groove 35 a stop 36 is provided. This stop structure may be accomplished by the application of a heated member which melts the thermoplastic to provide an obstruction in the continuous groove 35. The obstruction or stop 36 will of course be engaged by the protuberance 34 when the upper sheet 30 is slid to the limit of its travel.

FIGURES 6 and 7 illustrate another form wherein an upper sheet 40 is above a lower sheet 42. The sheet 40 is of extruded plastic and has an integral side strip or track 41, and the sheet 42 is extruded plastic with an integral side track 43. As with previous arrangements, the sheets 40 and 42 may be strips adapted for attachment to sheets.

The lower sheet 42 is provided with a T-shaped track 44 and the upper sheet has a downwardly extending projection or protuberance 45 which is T-shaped and slides in the track 44. At the end of the track 44 is a stop 47 which may be made by the application of a heated member to the thermoplastic material, and the stop will be engaged by the protuberance 45 when the sheet 40 is at the limit of its travel.

The protuberance 45 is preferably made by being extruded as a longitudinally extending ridge integral with the sheet 40, with the ridge being cut from the lower surface 46 of the sheet, leaving only the short projection or protuberance 45.

Thus it will be seen that I have provided an improved structure which meets the objectives and advantages above set forth. The structure may embody relatively inexpensive fastener strips which can be extruded at a high production rate. The strips are particularly well suited for attaching sheets or other elements in a strong fashion, and are useful in permitting relative limited movement of the strips or tracks without disengagement at the ends of the path of movement.

The drawings and specification present a detailed disclosure of the preferred embodiments of the invention, and it is to be understood that the invention is not limited to the specific changes and alternative constructions and methods falling within the scope of the principles taught by the invention.

I claim as my invention:

1. In combination,
   a lower sheet,
   an upper covering sheet on the lower sheet slidably parallel thereto in a linear direction to cover and uncover portions of the lower sheet,
      said lower sheet including a first extruded plastic fastener strip at the side thereof,
      said upper sheet including a second extruded fastener strip at the side thereof,
      said fastener strips having linearly extending continuous interlocked rib and groove elements relatively slidable linearly for holding the sheets together,
   a slide limiting stop member fixedly attached to the upper sheet being offset laterally of the second strip and having an enlarged plastic head thereon,
   a linearly extending track at the edge of the first strip integral therewith having a linearly extending extruded shaped plastic groove laterally of said first strip with overhanging sides to form a groove of less width than the enlarged head to lockingly receive the head and permit sliding of the head in a linear direction,
   said plastic groove extending the full length of said sheet and being parallel to said first strip,
   and plastic stops at the ends of said track groove engageable by the head closing said groove and preventing withdrawal of the head for limiting the sliding movement of the upper sheet relative to the lower sheet between said stops.

2. A combination in accordance with claim 1 wherein said slide limiting stop member includes, a relatively narrow flexible strip attached to the upper sheet and extending laterally off of the sheet and carrying the enlarged plastic head, said strip being flexible for disengaging said head from its track independent of said rib and groove elements so that the upper sheet may be slid off the lower sheet past the limit of said stops.

3. A combination in accordance with claim 1 wherein said stop member includes, a strip carrying said enlarged plastic head and attached to the upper sheet beside the second fastener strip and extending over the top of said strip to the track so that the stop member strip presses downwardly on said second fastener strip of the upper sheet.

References Cited by the Examiner

UNITED STATES PATENTS

| | | | |
|---|---|---|---|
| 3,111,774 | 11/1963 | Schade | 35—9 |
| 3,111,775 | 11/1963 | Schade | 35—9 |
| 3,125,813 | 3/1964 | Schade | 35—9 |
| 3,137,078 | 6/1964 | Cornell et al. | 35—9 |

EUGENE R. CAPOZIO, *Primary Examiner.*

LAWRENCE CHARLES, JEROME SCHNALL,
*Examiners.*